US011988456B2

(12) United States Patent
Zoughaib

(10) Patent No.: US 11,988,456 B2
(45) Date of Patent: May 21, 2024

(54) HEAT AND MATERIAL EXCHANGER

(71) Applicant: ASSOCIATION POUR LA RECHERCHE ET LE DEVELOPPEMENT DES METHODES ET PROCESSUS INDUSTRIELS "ARMINES", Paris (FR)

(72) Inventor: Assaad Zoughaib, Rambouillet (FR)

(73) Assignee: ASSOCIATION POUR LA RECHERCHE ET LE DEVELOPPEMENT DES METHODES ET PROCESSUS INDUSTRIELS "ARMINES", Paris (FR)

( * ) Notice: Subject to any disclaimer, the term of this patent is extended or adjusted under 35 U.S.C. 154(b) by 716 days.

(21) Appl. No.: 17/262,569

(22) PCT Filed: Jul. 18, 2019

(86) PCT No.: PCT/FR2019/051812
§ 371 (c)(1),
(2) Date: Jan. 22, 2021

(87) PCT Pub. No.: WO2020/021186
PCT Pub. Date: Jan. 30, 2020

(65) Prior Publication Data

US 2021/0302107 A1 Sep. 30, 2021

(30) Foreign Application Priority Data

Jul. 25, 2018 (FR) .................................... 1856934

(51) Int. Cl.
*F28D 21/00* (2006.01)
*B05B 1/24* (2006.01)

(52) U.S. Cl.
CPC ........... *F28D 21/0015* (2013.01); *B05B 1/24* (2013.01)

(58) Field of Classification Search
CPC ..... F28D 21/0015; B05B 1/24; B01D 61/364; C02F 1/265
See application file for complete search history.

(56) References Cited

U.S. PATENT DOCUMENTS

| | | | | |
|---|---|---|---|---|
| 4,435,339 A * | 3/1984 | Kragh | ..................... | B01D 1/16 261/153 |
| 2013/0340449 A1* | 12/2013 | Kozubal | ................. | F24F 3/147 62/271 |
| 2022/0178619 A1* | 6/2022 | Rousselet | ............. | F28D 7/0066 |

FOREIGN PATENT DOCUMENTS

| | | |
|---|---|---|
| DE | 41 06 895 | 6/1992 |
| EP | 0 111 423 | 6/1984 |

(Continued)

OTHER PUBLICATIONS

Search Report for FR Application No. 1856934 dated Apr. 2, 2019, 2 pages.

(Continued)

*Primary Examiner* — Marc E Norman
(74) *Attorney, Agent, or Firm* — Nixon & Vanderhye, PC

(57) ABSTRACT

This exchanger (100) includes:

substantially parallel and vertical membranes (30), permeable to vapor and impermeable to a liquid, these membranes delimiting zones, each of said zones belonging alternately to a first type of zone and to a second type of zone;

the zones of said first type including in the upper portion a spray nozzle (20) configured to vaporize a liquid along a plane (R) substantially parallel to the membranes, and in the lower portion a first collector (50), independent and separated from the zones of the second type, (Continued)

a first pipe (10) supplying the spray nozzles (20) of the zones (Z20) of said first type with a liquid.

6 Claims, 3 Drawing Sheets

(56) References Cited

FOREIGN PATENT DOCUMENTS

| | | |
|---|---|---|
| GB | 2 151 155 | 7/1985 |
| WO | 2016/053100 | 4/2016 |

OTHER PUBLICATIONS

International Search Report for PCT/FR2019/051812 dated Nov. 15, 2019, 5 pages.
Written Opinion of the ISA for PCT/FR2019/051812 dated Nov. 15, 2019, 5 pages.

* cited by examiner

HEAT AND MATERIAL EXCHANGER

This application is the U.S. national phase of International Application No. PCT/FR2019/051812 filed Jul. 18, 2019 which designated the U.S. and claims priority to FR Patent Application No. 1856934 filed Jul. 25, 2018, the entire contents of each of which are hereby incorporated by reference.

BACKGROUND

The invention relates to a heat and material exchanger.

Known in the prior art of heat and material exchangers in particular are exchangers using direct contact between a sprayed liquid and a gas. This type of exchanger allows effective exchange of heat and of material but has a major disadvantage linked to the entrainment of liquid drops in the gas flow. This entrainment of drops constitutes a risk when the liquid is toxic or corrosive.

Also known are exchangers allowing an indirect exchange in which the flow is separated by membranes permeable to the vapor and impermeable to the liquid. The implementation of such exchangers is delicate, due to the static pressure of the liquid flowing in the pipe formed by the membranes. This pressure can cause sealing problems and requires membranes having particular mechanical properties contradictory with permeability to the vapor which make them ineffective and costly to manufacture.

The invention proposes a heat and material exchanger which does not have the disadvantages of those of the prior art.

OBJECT AND SUMMARY OF THE INVENTION

The invention relates to an exchanger including:

- substantially parallel and vertical membranes, permeable to vapor and impermeable to a liquid, these membranes delimiting zones, each of these zones belonging alternately to a first type of zone or to a second type of zone;
- the zones of the first type including in the upper portion a spray nozzle configured to spray a liquid along a plane substantially parallel to the membranes, and in the lower portion a first liquid collector, independent and separated from the zones of the second type, and
- a first pipe arranged to supply the spray nozzles of the zones of the first type with said liquid.

In a particular embodiment of the invention, the membranes are of polypropylene or of polyamide.

In conformity with the invention, the liquid can be an aqueous solution more or less rich in salt, or salt-free.

In a first embodiment, the exchanger according to the invention includes a passage allowing the circulation of a gas in the zones of the second type.

In a particular arrangement of this first embodiment, the exchanger according to the invention includes a fan allowing improving the circulation of the gas in the zones of the second type.

The invention also relates to a method for using an exchanger according to this first embodiment, this method including:

- a step of circulating a relatively hot and humid gas in the zones of the second type;
- a step of circulating a relatively cold and salt-rich liquid in the first pipe, this liquid being sprayed by the spray nozzles in the zones of the first type; and
- a step of collecting a warmed and diluted liquid in the first collector.

The invention relates to another method for using an exchanger according to the first embodiment of the invention, this method including:

- a step of circulating a relatively cold gas in the zones of the second type;
- a step of circulating a relatively hot and salt-poor liquid in the first pipe, this liquid being sprayed by the spray nozzles in the zones of the first type; and
- a step of collecting a cooled and concentrated liquid in the first collector.

In these two methods, the spray nozzles disperse the liquid at a pressure identical to that of the gas in the zones of the first type. The gas which circulates in the adjacent zones of the second type is heated and saturated with vapor when the liquid is hotter than the gas and when its vapor pressure is greater than that of the gas.

In the reverse case, if the liquid is colder than the gas and its vapor pressure is lower than that of the gas, the gas is cooled and its vapor concentration is reduced.

The liquid, (or solution) after the exchange, cooled and concentrated or heated and diluted, is collected in a collector arranged so that there is no contact between the liquid and the gas.

In a second embodiment of the exchanger according to the invention:

- the zones of the second type include in the upper portion a spray nozzle configured to vaporize a liquid along a plane substantially parallel to the membranes, and in the lower portion a collector, independent and separated from the zones of the first type; and
- a second pipe supplying the spray nozzles of the zones of the second type with a liquid.

In this second embodiment, the exchange of mass and of heat occurs between two liquids separated by the membranes.

The invention also relates to a method of using an exchanger according to this second embodiment. This method includes:

- a step of circulating a relatively cold and salt-poor liquid in the first pipe, this liquid being sprayed by the spray nozzles in the zones of the first type;
- a step of circulating a relatively hot and salt-rich liquid in the second pipe, this liquid being sprayed by the spray nozzles in the zones of the second type;
- a step of collecting a warmed and diluted liquid in the first collector in the lower portion of the zones of the first type; and
- a step of collecting a cooled and concentrated liquid in the second collector in the lower portion of the zones of the second type, this second collector being separated from the first collector to prevent mixing of the collected liquids.

In this embodiment, the hot and diluted solution is concentrated by surrendering its heat and some vapor to the second, cold solution which is warmed and diluted.

Generally, the invention thus proposes an exchanger of heat and mass between a liquid and a gas or between two liquids through a membrane, the heat and mass exchange being due to a difference of temperature and a difference of vapor pressure between the two fluids. The permeability of the membrane to the vapor of the liquid solvent allows the transfer of vapor between the two fluids.

Thus, the expressions “hot,” “cold,” “diluted,” “concentrated,” “salt-rich,” “salt-poor” must be understood in a relative sense, for expressing the differences between the state of the fluids on either side of the membranes to allow the exchanges of heat and mass between the zones of the first and second type, and not in an absolute sense.

The invention can in particular be used for:

- concentrating or diluting a solution by the evaporation or condensation of vapor with no gap in total pressure on either side of a membrane permeable to the solvent vapor;
- dehydrating or humidifying a gas by exchange with a cold and concentrated solution or a hot and diluted solution without entering into contact with the solution.

BRIEF DESCRIPTION OF THE DRAWINGS

Other features and advantages of the present invention will appear in the following description of a given embodiment, given by way of a non-limiting example, with reference to the appended drawings, in which:

FIGS. 3 and 4 show an exchanger conforming to a third embodiment of the invention.

FIRST EMBODIMENT

Figure 1:
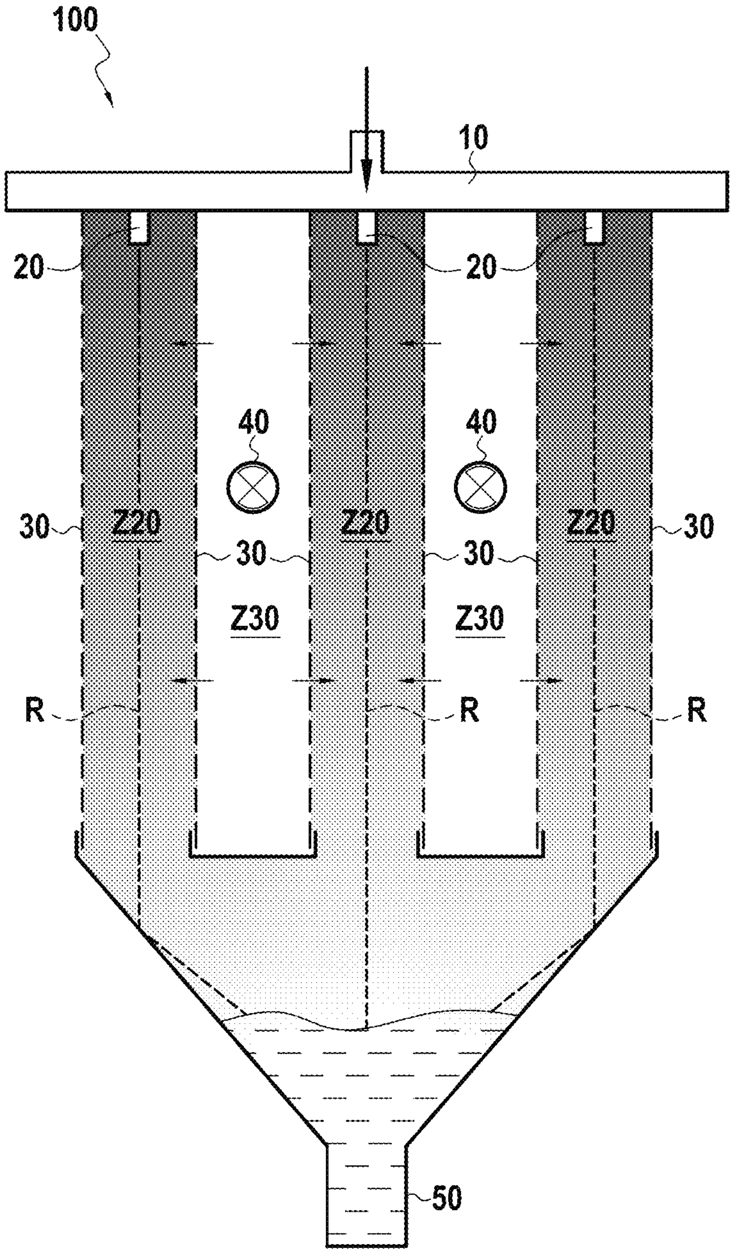
FIG. 1 shows an exchanger conforming to a first embodiment of the invention.

FIG. 1 shows an exchanger 100 conforming to a first embodiment of the invention. It can be used to refresh and dehumidify hot and humid air (for example 25° C. and 60% RH) circulating in the zones Z30 delimited by membranes 30 permeable to water vapor. A fan 40 can be used for blowing the hot air.

In the embodiment described here, a zone Z20 with a spray nozzle over it is located on either side of each air circulation zone Z30. These spray nozzles 20 are supplied by a pipe 10 in which a cold (typically 15° C.) and salt-rich liquid circulates. The spray nozzles 20 spray the liquid substantially into a flat sheet R parallel to the membranes 30.

In this embodiment of the invention, like in those described hereafter, the liquid supply pressure upstream of the nozzles can be on the order of 2 bars.

When the salt-rich liquid is sprayed by the spray nozzles 20 in the zones Z20, the air comprised in these zones Z20 surrenders its humidity which is absorbed by the salt. It becomes colder and drier than the air in the zones Z30.

The air in the zones Z30 cools and its humidity migrates toward the zones Z20 through the membranes 30, as shown by the horizontal arrows. The liquid in the zones Z20 is diluted; it is recovered in a collector 50 arranged so that the liquid collected is not in contact with the zones Z30.

In this embodiment:

- the more the liquid sprayed by the spray nozzles 20 is concentrated with salt, the more the dehumidification of the hot and humid air in the zones Z30 is favored; and
- the more the liquid sprayed by the spray nozzles 20 is cold, the more the cooling of the air circulating in the zones Z30 is favored.

SECOND EMBODIMENT

Figure 2:
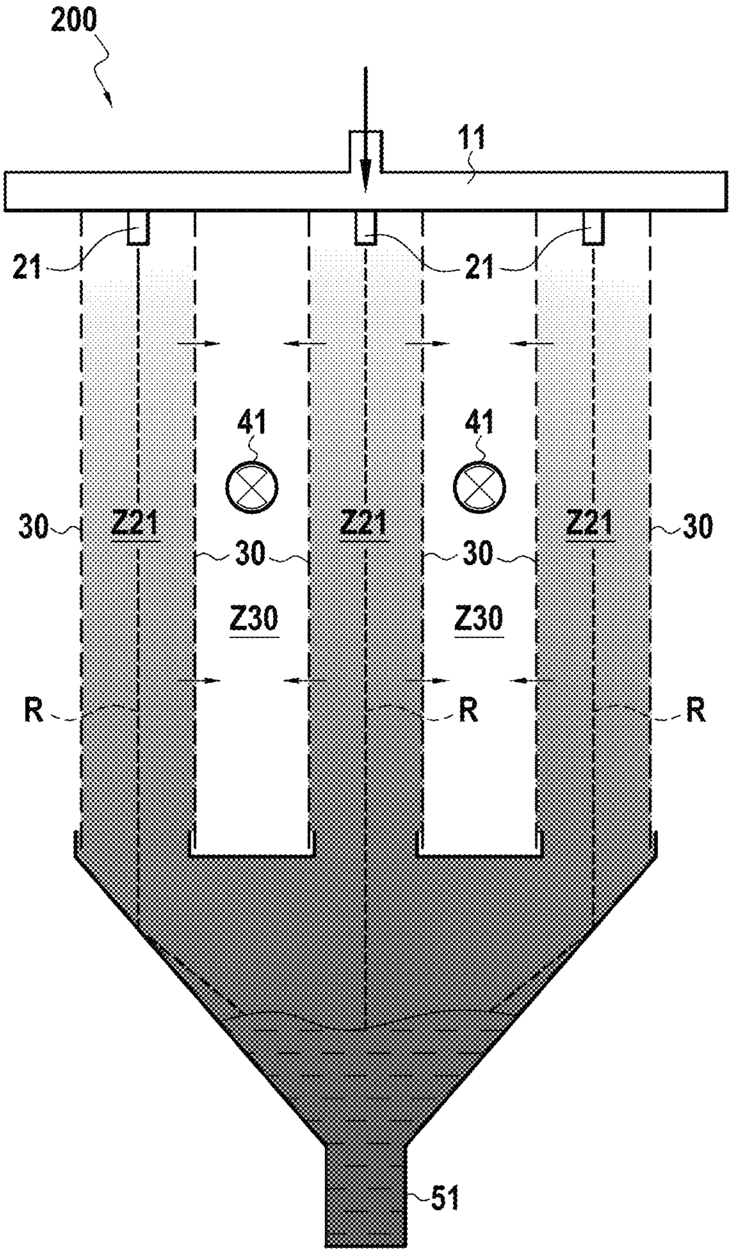
FIG. 2 shows an exchanger conforming to a second embodiment of the invention.

FIG. 2 shows an exchanger 200 conforming to a second embodiment of the invention. It can be used to cool and concentrate a hot and salt-poor, or even salt-free liquid.

In the embodiment described here, this liquid (at 35° C. for example) is sprayed by the spray nozzles 21 in zones Z21 delimited by membranes permeable to water vapor, the spray nozzles being supplied by a pipe 11. The spray nozzles 21 spray the liquid substantially in a flat sheet R parallel to the membranes 30.

As in the first embodiment, the zones Z21 are separated by zones Z30 in which air circulates. But in this embodiment, the air in these zones Z30 is colder than the liquid sprayed in the zones Z21. The air in the zones Z30 is for example at ambient temperatures, for example at 24° C.

In the zones Z21, the air, in contact with the hot sprayed liquid, is warmed and charged with humidity. The liquid cools and is concentrated. It is collected in a collector 51 arranged so that the liquid collected is not in contact with the zones Z30.

The water vapor migrates from the zones Z21 to the zones Z30 through the membranes 30 as shown by the horizontal arrows. In the zones Z30, the air is warmed and is charged with humidity.

This second embodiment of the invention advantageously allows cooling the liquid below the temperature of the air circulating in the zones Z30, thanks to the phenomenon of evaporation, until it attains the wet-bulb temperature.

THIRD EMBODIMENT

Figure 3:
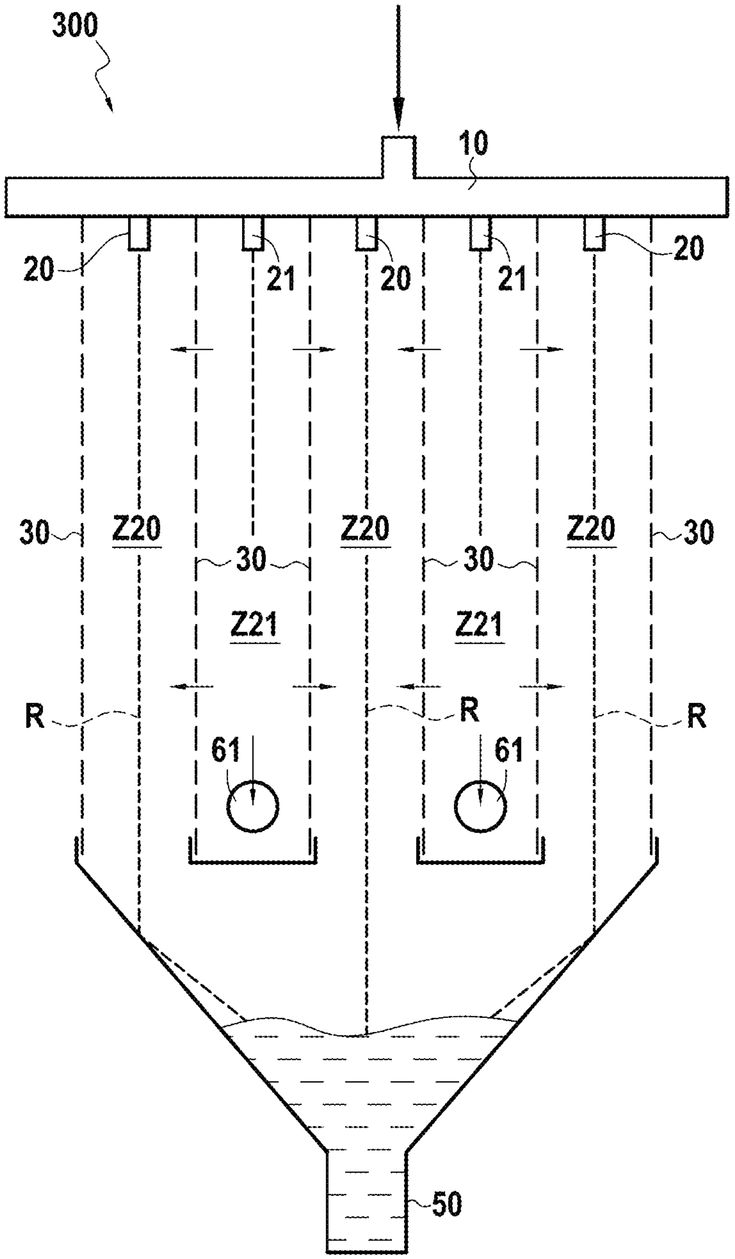

FIGS. 3 and 4 show a third embodiment of the invention. It can be used to desalinate a liquid.

In this embodiment, the exchanger 300 includes:

- a pipe 10 supplying the spray nozzles 20 with a cold salt-poor, or even salt-free liquid, this liquid being sprayed by the spray nozzles 20 in the zones Z20; and
- a pipe 11 supplying the spray nozzles 21 with a hot, concentrated salt liquid, this liquid being sprayed by the spray nozzles 21 in the zones Z21.

The zones Z20 and Z21 are alternated and separated by membranes 30 permeable to water vapor. In each of the zones, the spray nozzles 20, 21 spray the liquid in a flat sheet R substantially parallel to the membranes.

In the zones Z21, the air in contact with the hot liquid is warmed and is charged with humidity. The water vapor migrates toward the zones Z20 through the membranes 30.

In the zones Z20, the air is warmed and is charged with water vapor due to the migration of water vapor coming from the zones Z21 as shown by the horizontal arrows.

In the zones Z20, the air surrenders its heat to of the flow of cold, salt-poor liquid increasing the quantity of water. The hot and diluted liquid is collected in a collector 50 arranged so that this liquid is not in contact with the zones Z21.

In the zones Z21, the quantity of water is reduced due to the migration, and the salt-rich liquid is concentrated. The cold and concentrated liquid is exhausted by U-shaped pipes leading through openings 61 into a collector 51 arranged so that this liquid is not in contact with the zones Z20.

This embodiment allows concentrating the salt-rich liquid introduced into the pipe 11: it can be used for desalination operations.

In this third embodiment of the invention, the exchanger 300 has a structure 7 to which the membranes 30 are attached. The collectors 50 and 51 have shoulders in which these membranes 30 are inserted, thus avoiding any contact between the different liquids.

An arrangement of this type can also be used in the exchangers 100 and 200 described previously with reference to FIGS. 1 and 2 to avoid contact between the liquid in the collectors 50, 51 and the air circulating in the zones Z30.

OTHER USE EMBODIMENT OF THE INVENTION

As previously mentioned, in the embodiment of FIG. 1, the solution recovered in the collector 50 is diluted by the water vapor which has migrated from the zones Z30 through the membrane 30. It is necessary, to be able to re-use it at the input to the pipe 10, to remove the water added to it.

To carry out this operation, it is possible to head the diluted solution recovered in the collector 50 and to inject it into the pipe 11 of the exchanger of FIG. 2 in order to reduced its temperature and to concentrate it.

The invention claimed is:

1. An exchanger including:

parallel and vertical membranes, permeable to vapor and impermeable to a liquid, said membranes delimiting zones, each of said zones belonging alternately to a first type of zone and to a second type of zone;

the zones of said first type including in an upper portion a spray nozzle configured to spray a liquid along a plane parallel to said membranes, and in a lower portion a first collector, independent and separated from the zones of the second type; and a first pipe supplying the spray nozzles of the zones of the first type with a liquid.

2. The exchanger according to claim 1, wherein it includes:

a passage allowing the circulation of a gas in the zones of the second type.

3. A method for using an exchanger according to claim 2, including:

a step of circulating a relatively hot and humid gas in the zones of the second type;

a step of circulating a relatively cold and salt-rich liquid in said first pipe, said liquid being sprayed by said spray nozzles in the zones of said first type; and a step of collecting a warmed and diluted liquid in said first collector.

4. The method for using an exchanger according to claim 2, including:

a step of circulating a relatively cold gas in the zones of the second type;

a step of circulating a relatively hot and salt-poor liquid in said first pipe, said liquid being sprayed by said spray nozzles in the zones of said first type; and a step of collecting a cooled and concentrated liquid in said first collector.

5. The exchanger according to claim 1, wherein:

the zones of said second type including in the upper portion a spray nozzle configured to vaporize a liquid along a plane substantially parallel to said membranes, and in the lower portion a second collector, independent and separated from the zones of said first type, and said exchanger also including:

a second pipe supplying the spray nozzles of the zones of said second type with a liquid.

6. The method for using an exchanger according to claim 5, including:

a step of circulating a relatively cold and salt-poor liquid in said first pipe, said liquid being sprayed by said spray nozzles in the zones of said first type;

a step for circulating a relative hot and salt-rich liquid in said second pipe, said liquid being sprayed by said spray nozzles in the zones of said second type;

a step of collecting a warmed and diluted liquid in the first collector in the lower portion of the zones of the first type; and a step of collecting a cooled and concentrated liquid in the second collector in the lower portion of the zones of the second type.

* * * * *